(12) United States Patent
Wood et al.

(10) Patent No.: US 7,058,585 B1
(45) Date of Patent: Jun. 6, 2006

(54) CARDLESS METHOD FOR REDUCING FRAUD IN HEALTHCARE PROGRAMS

(76) Inventors: Richard Glee Wood, 4627 Cashel Cir., Houston, TX (US) 77069; Wesley Jack White, Jr., 6219 Squires Ct., Spring, TX (US) 77389

( * ) Notice: Subject to any disclaimer, the term of this patent is extended or adjusted under 35 U.S.C. 154(b) by 58 days.

(21) Appl. No.: 10/832,529

(22) Filed: Apr. 27, 2004

Related U.S. Application Data

(60) Provisional application No. 60/467,957, filed on May 5, 2003.

(51) Int. Cl.
*G06Q 40/00* (2006.01)

(52) U.S. Cl. .......................................... 705/4
(58) Field of Classification Search ................ 705/2–4; 902/26
See application file for complete search history.

(56) References Cited

U.S. PATENT DOCUMENTS

| | | | | |
|---|---|---|---|---|
| 5,884,271 | A | 3/1999 | Pitroda | 705/1 |
| 6,011,858 | A | 1/2000 | Stock | 382/115 |
| 6,012,035 | A | 1/2000 | Freeman | 705/2 |
| 6,163,770 | A | 12/2000 | Gamble | 705/4 |
| 6,208,973 | B1 | 3/2001 | Boyer | 705/2 |
| 6,898,299 | B1 * | 5/2005 | Brooks | 382/115 |

FOREIGN PATENT DOCUMENTS

WO   WO 01/04821 A1 * 1/2001

OTHER PUBLICATIONS

Eiland, "A Bill to be Entitled an Act." Acts of the 75th Legislature, Regular Session, 1997.
Ogden, "A Bill to be Entitled an Act." Acts of the 78th Legistlature, Regular Session, 2003.
"Texas Senate Special Commitee on Prompt Payment of Health Care Providers." Interim Report to the 78th Legislature, Nov. 2002.
Rehnquist, Janet. "Improper Fiscal Year 2002 Medicare Fee-for-Service Payments," Jan. 8, 2003 (A17-02-02202).

* cited by examiner

*Primary Examiner*—Joseph Thomas
*Assistant Examiner*—Christopher L Gilligan
(74) *Attorney, Agent, or Firm*—Buskop Law Group, P.C.; Wendy Buskop

(57) ABSTRACT

The method for reducing fraud in a healthcare program by registering a service provider with a healthcare provider and issuing a service provider identification code entails registering at least one service of the service provider with the private healthcare provider and identifying a claim code for each registered service; issuing a code based on data from a biometric reading, a keypad entry with a PIN code, or an electronic signature pad entry to an individual related to a benefits program of the healthcare provider; using the code to determine if the individual is eligible for the healthcare program and performing three transmissions of information to reduce fraud in the systems.

11 Claims, 4 Drawing Sheets

CARDLESS METHOD FOR REDUCING FRAUD IN HEALTHCARE PROGRAMS

BACKGROUND

The present application claims priority to co-pending U.S. Provisional Patent Application Ser. No. 60/467,957 filed on May 5, 2003.

FIELD

The present embodiments relate to a cardless method for reducing fraud in private healthcare programs that tracks identification, implements security measures, and other information to facilitate the transfer of funds and eliminate fraud in the benefit.

Providers of benefits from private healthcare providers have concerns wherein individuals can "double dip" into private healthcare provider programs getting twice the payment, or service providers could inadvertently "double bill" or inappropriately bill for services rendered.

In addition, problems have existed wherein proper service and goods providers for healthcare programs have had to wait long periods of time to get paid for their services or goods rendered to the eligible employee. This situation has caused benefit costs to be very high, reducing overall benefits available due to these fraud issues.

A need has long existed for a system wherein the private healthcare provider advances funds to pay a service or goods provider so that an eligible individual does not have to handle money and the provider is promptly paid.

This need has been particularly great for incapacitated individuals such as those in nursing homes who are no longer able to handle funds or complicated transactions themselves.

A need exists for a method to reduce the magnitude of transaction costs involved in reviewing and adjudicating payment requests to a private healthcare provider that would have the effect of reducing the rate of increase of private healthcare provider benefit costs or enable more benefits to be provided to more people.

A need exists to reduce the traditionally high cost of benefit administration, including the review and adjudication of payment requests that result in service, goods or benefit providers having to act as "banks" or "credit sources" for individuals eligible for the benefit.

Methods and apparatus exist to streamline the private insurance claim payment process, as exampled in Gamble U.S. Pat. No. 6,163,770. The Gamble reference reveals using a digital electrical apparatus to generate output for insurance documentation for a first insurance policy having a first risk and claims and reveal a concurrent second insurance policy for a second risk, wherein the second risk is different from the first. The processor of this method is connected to a memory device for storing and retrieving operations including machine-readable signals in the memory device, to an input device for receiving input data and converting the input data into input electrical data, to a visual display unit for converting output electrical data into output having a visual presentation, to a printer for converting the output electrical data into printed documentation, wherein the processor is programmed to control the apparatus to receive the input data and to produce the output data by steps including: inputting actuarial assumptions defining the first insurance policy and computing a value of a specific financial attribute of the first insurance policy; the method further including the step of inserting the value of the financial attribute in the first insurance policy and other printed documentation related to the first insurance policy. The Gamble reference does not meet the needs identified above.

Other methods and apparatus that teach techniques to streamline the private insurance claim payment process are exampled in Boyer U.S. Pat. No. 6,208,973; Freeman U.S. Pat. No. 6,012,035; Stock U.S. Pat. No. 6,011,858; and Pitroda U.S. Pat. No. 5,884,271. The prior art listed herein is hereby incorporated by reference.

SUMMARY

The cardless method for reducing fraud in healthcare programs entails registering a service or goods provider with a private healthcare provider and issuing a service provider identification code to that provider. Services and goods of the provider can be registered with a healthcare provider and claim codes correspond with each registered service.

The method involves using a form of identification, such as fingerprints or retinal reading for individuals eligible for a healthcare program. In addition to the biometrics reading, data from a keypad entry with a "PIN" code or an electronic signature pad entry can be performed. The method involves a first identification check and then three transmissions between the service provider to the healthcare provider about proposed goods and services, information about the individual, and information about payment for the provider.

The method is used to reduce fraud in a healthcare program. The method entails registering a service provider with a healthcare provider and issuing a service provider identification code and registering at least one service or at least one good of the service provider with the healthcare provider and identifying a claim code for each registered service or registered good.

The method involves three transmissions: a first transmission from the service provider to the healthcare provider (which includes the service provider identification code) the individual identification code, proposed product information for the individual, and proposed service information for the individual. The first transmission also contains corresponding claim codes for the proposed product, corresponding claim codes for the proposed service, a request to confirm the individual's eligibility for benefits under the healthcare program, a validation that the proposed good or service is approved for the individual, the service provider's eligibility to render services or provide goods under the healthcare program, and a request to participate in an accelerated payment program for the proposed good or the proposed service.

The second transmission from the private healthcare provider to the service provider, wherein the second transmission comprises of: the individual's eligibility for benefits under the healthcare program; a validation that the proposed good or proposed service is approved for the individual; a validation of the service provider's eligibility to render services under the healthcare program; a confirmation that a payment program is available; and an authorization code to provide the proposed product and/or proposed service.

A third transmission is from the service provider to the private healthcare provider, and comprises of a list of claim codes for services rendered; acknowledgement by the individual that information on the product and/or service was provided to the individual; acknowledgement that the product or service has been received from the service provider; and a request for accelerated payment by the healthcare provider to the service provider.

BRIEF DESCRIPTION OF THE DRAWINGS

The present embodiments will be explained in greater detail with reference to the appended Figures, in which.

Figure 1:
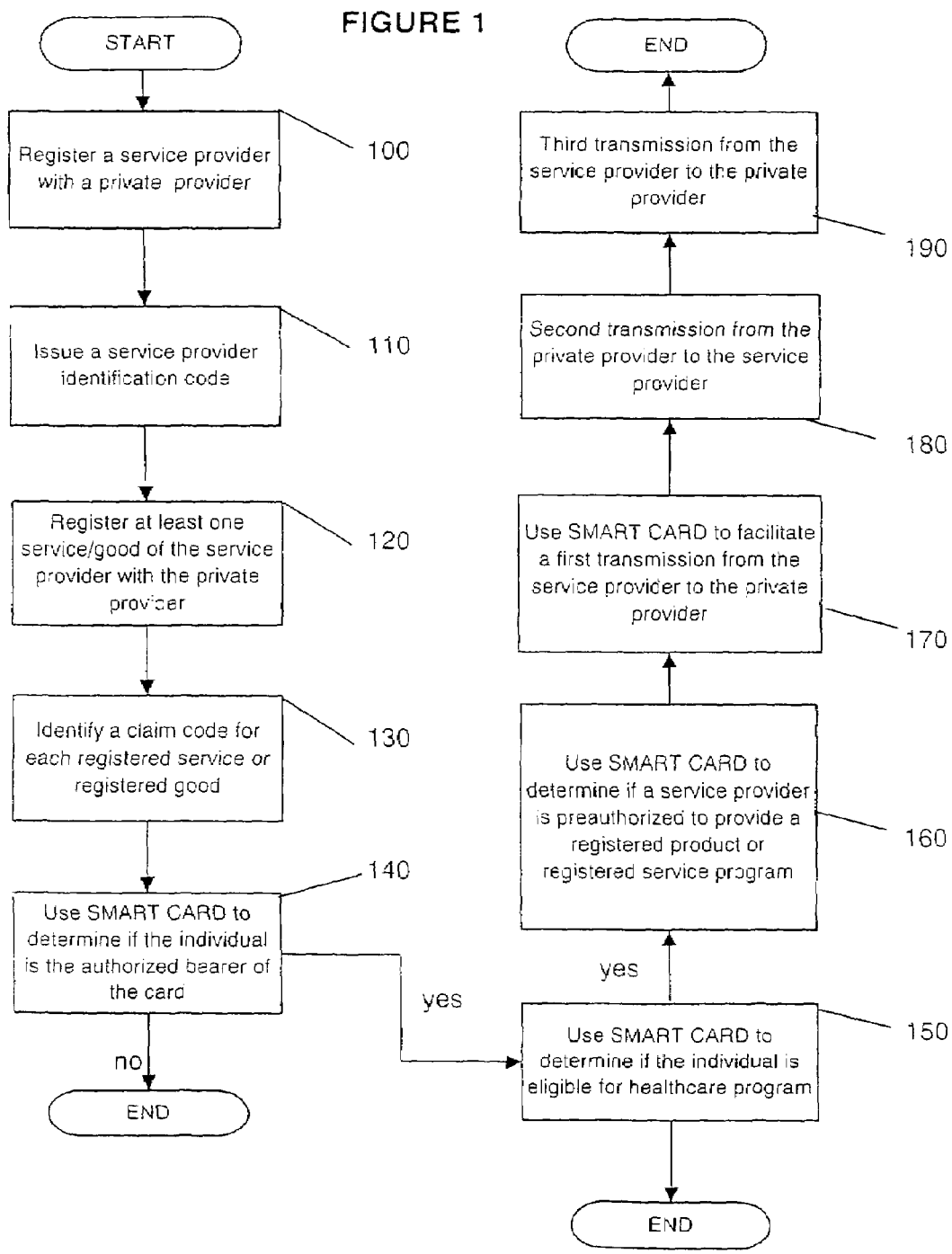
FIG. 1 depicts a diagrammatic representation of an embodied method.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular embodiments herein and it can be practiced or carried out in various ways.

The embodied methods are for accelerating the provision of funds to a service or goods provider from a healthcare provider, such as an insurance company or self-funded healthcare provider.

The embodied methods provide a cardless method for reducing fraud in healthcare programs. The methods involve registering a service or goods provider with a private healthcare provider and issuing a service provider identification code to that provider. Services and goods of the provider can be registered with a healthcare provider and claim codes correspond with each registered service.

These methods involve using a form of identification, such as fingerprints or retinal reading for individual eligible for a healthcare program. In addition to biometrics reading, data from keypad entry with a personal identification code or PIN or an electronic signature pad entry can be used. The methods involve a first identification check and at least three transmissions between the service provider to the private healthcare provider about proposed goods and services, information about the individual, and information about payment for the provider.

These methods relate to the provision of a private sector benefit using a fingerprint reader, a retina reader, or similar biometric device.

These methods advantageously reduce fraud occurring in medical benefits by providing a safe method of pre-authorizing users for benefits prior to rendering the benefit.

These methods advantageously prevent ineligible users from using services for which they are not authorized. These methods safeguard private healthcare entities from users attempting to apply for the same service more than once, in other words "double dipping".

The first step of the method involves registering a service provider with a healthcare provider and issuing a service provider identification code. Next, at least one service or at least one good of the service provider is registered with the healthcare provider and a claim code is issued which corresponds to each registered service or registered good.

Individuals related to the healthcare program are provided with an individual identification code that corresponds to a finger print or retina pattern. The first individual's identification code is linked to a biometric data of the first individual.

A service provider has a biometrics reader. The method proceeds by comparing second biometric data from a second individual against the first individual code to determine if the second individual is eligible for benefits from the healthcare program.

Once an individual's biometric is read, a first transmission from the service provider is made to the healthcare provider, wherein the first transmission is a service provider identification code (the individual identification code described above) and certain proposed information. Alternatively, a service provider can use a keypad that can receive a personal identification code or PIN code or a device for receiving an electronic signature at the service providers.

Example of cardless devices are biometric readers and electronic signature pad. Other devices that can be used accept contact less smart cards, such as Radio Frequency Identification (RFID) readers and other such devices readily available in the market. Examples of devices are electronic signature pads manufactured by Welch Allyn model number TT3100 or a keypad for a PIN entry manufactured by TRANZ model number 380.

The proposed information can be proposed product information for the individual; proposed service information for the individual; corresponding claim codes for the proposed product; and corresponding claim codes for the proposed service.

The first transmission preferably includes a request to confirm the individual's eligibility for benefits under the healthcare program; a validation that the proposed good or service is approved for the individual; the service provider's eligibility to render services or provide goods under the healthcare program; and a request to participate in an accelerated payment program for the proposed good or the proposed service.

A second transmission is then made from the private healthcare provider to the service provider. The second transmission includes the individual's eligibility for benefits under the healthcare program, a validation that the proposed good or proposed service is approved for the individual, a validation of the service provider's eligibility to render services under the healthcare program, a confirmation that payment, optionally accelerated payment, is available, and an authorization code to provide the proposed product and/or proposed service.

The third transmission is from the service provider to the private healthcare provider. The third transmission includes a list of claim codes for services rendered, an acknowledgement by the individual that information on the product and/or service was provided to the individual, an acknowledgement that the product or service has been received from the service provider, and a request for accelerated payment by the private healthcare provider to the service provider.

The biometric code enables access to and contains information on at least one or more of the following:

a. individual name (example—Richard Wood);
b. individual address (example—2396 Wood Street, Houston, Tex. 77019);
c. individual phone number (example—713-323-5555);
d. individual fax number (example—713-323-5554);
e. individual email address (example—Wood@aol.com);
f. private healthcare provider name and/or private sector administrator name;
g. healthcare provider address;
h. healthcare provider phone number (example—281-873-8682);
i. healthcare provider fax number;
j. healthcare provider e-mail;
k. healthcare provider website;
l. healthcare provider claims representative;

m. type of benefit plan or plans;
n. individual benefit number (example—Group 200116289.);
o. individual group number or group plan number (example—KLINASD);
p. individual co-pay amount (example—$25);
q. individual benefit history;
r. instructions;
s. other phone numbers;
t. issue date or "validity" date;
u. statements as to ownership;
v. statements as to eligibility of the individual on the plan to get benefits, and
w. disclaimers concerning use, misuse, and revocation of the benefits.

The accelerated fund payment schedule contemplated by these methods can be a 100% payment schedule or a partial accelerated fund payment schedule depending on the contract with the healthcare provider. The funds can move electronically from the healthcare provider's bank account to the service provider's bank account, such as by wire transfer, or normal electronic banking procedures.

The biometric information is used to not only contain the information described above, but to initiate a link to the healthcare provider's database and between the healthcare provider's database and the service provider's database and the service provider's bank account. The information facilitates a first transmission from the service provider to the healthcare provider. This first transmission can include information on:
a. determination if the individual is eligible;
b. determination that the service provider is authorized to provide the service;
c. proposed benefit costs;
d. information on benefit; and
e. an acknowledgement that at least one benefit has been rendered from the service provider to the individual.

A second transmission from the healthcare provider to the service provider occurs next. This second transmission can contain information on any amount of payment required by the individual. The amount of payment can be all or part of a co-payment fee, all or part of a deductible fee, and combinations of these fees.

A third transmission follows to the healthcare provider from the service provider. This third transmission includes an acknowledgement that the amount of the co-payment and the deductible has been paid by the individual to the service provider thereby initiating payment by the healthcare provider.

Within the scope of this application, the healthcare provider is considered a private entity, such as an insurance company or self-funded healthcare provider.

The method involves that on approximately the same day that the third transmission is received by the healthcare provider, or perhaps a few days later such as between 1 and 21 days, funds are then transmitted from the healthcare provider to the service provider for the benefit provided to the individual. This accelerated payment plan is a vast improvement over known systems that take up to eight months to pay a service provider.

This method contemplates that benefits can be a service related to a health procedure or eye glass prescriptions, dental examinations, dental procedures, mental health procedures, mental health therapies, physical therapy, podiatrists, doctor's visits, hospital visits, out-patient visits, or other benefits.

Now and with reference to the Figures, FIG. 1 shows a diagram of an embodied method.

First, a service provider is registered with a healthcare provider (100) and the service provider is given an identification code is (110). Next, at least one service or good of the service provider is registered with the healthcare provider (120) and a claim code is given for the given registered service or good (130).

A biometric reader, then, used to determine if an individual is authorized for benefits of the healthcare program (150). Again, alternatively to the biometric reader is a keypad onto which a PIN code can be typed or an electronic signature pad onto which the individual can sign their name for electronic transmission.

The biometrics, PIN or electronic signature data is used in a first transmission from the service provider to a program administrator (170) for a healthcare provider.

Figure 2:
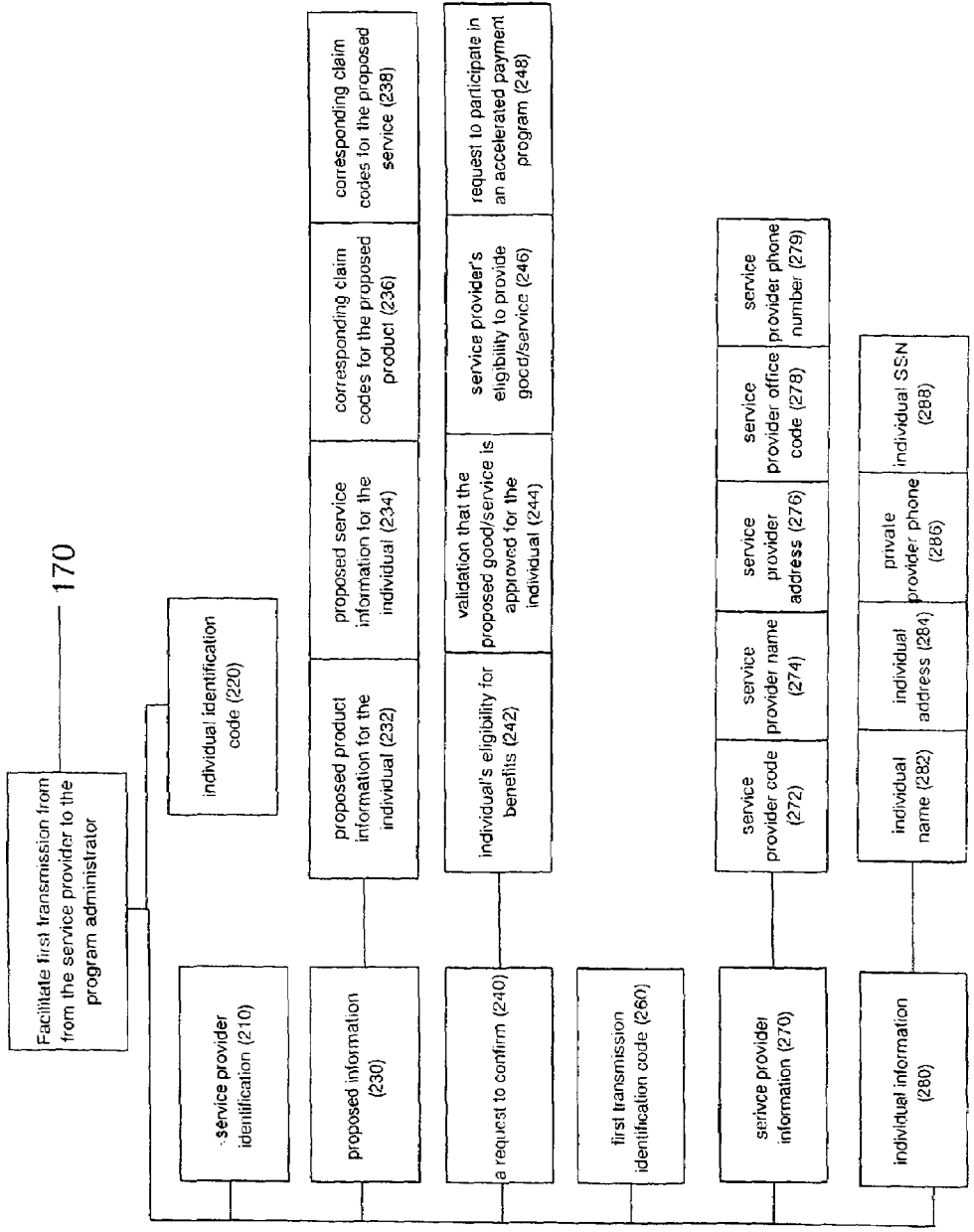
FIG. 2 depicts a diagrammatic representation of the first transmission.

As shown in FIG. 2, the first transmission (170) includes service provider identification (210), individual identification code (220), proposed information (230), and a request to confirm (240). The proposed information (230) involves proposed product information for the individual (232), proposed service information for the individual (234), corresponding claim codes for the proposed product (236), and corresponding claim codes for the proposed service (238). The request to confirm (240) entails validation that individual's eligibility for benefits (242), the proposed good and/or service is approved for the individual (244), service provider's eligibility to provide good and/or service (246), and request to participate in an accelerated payment program (248).

The first transmission (170) can further include a first transmission identification code (260); service provider information (270); and individual information (280). Examples of service provider information (270) are service provider code (272), service provider name (274), service provider address (276), service provider office code (278), and service provider phone number (279). Examples of individual information (280) are individual name (282), individual address (284), healthcare provider phone (286), and individual social security number (288), and combinations of these.

Figure 3:
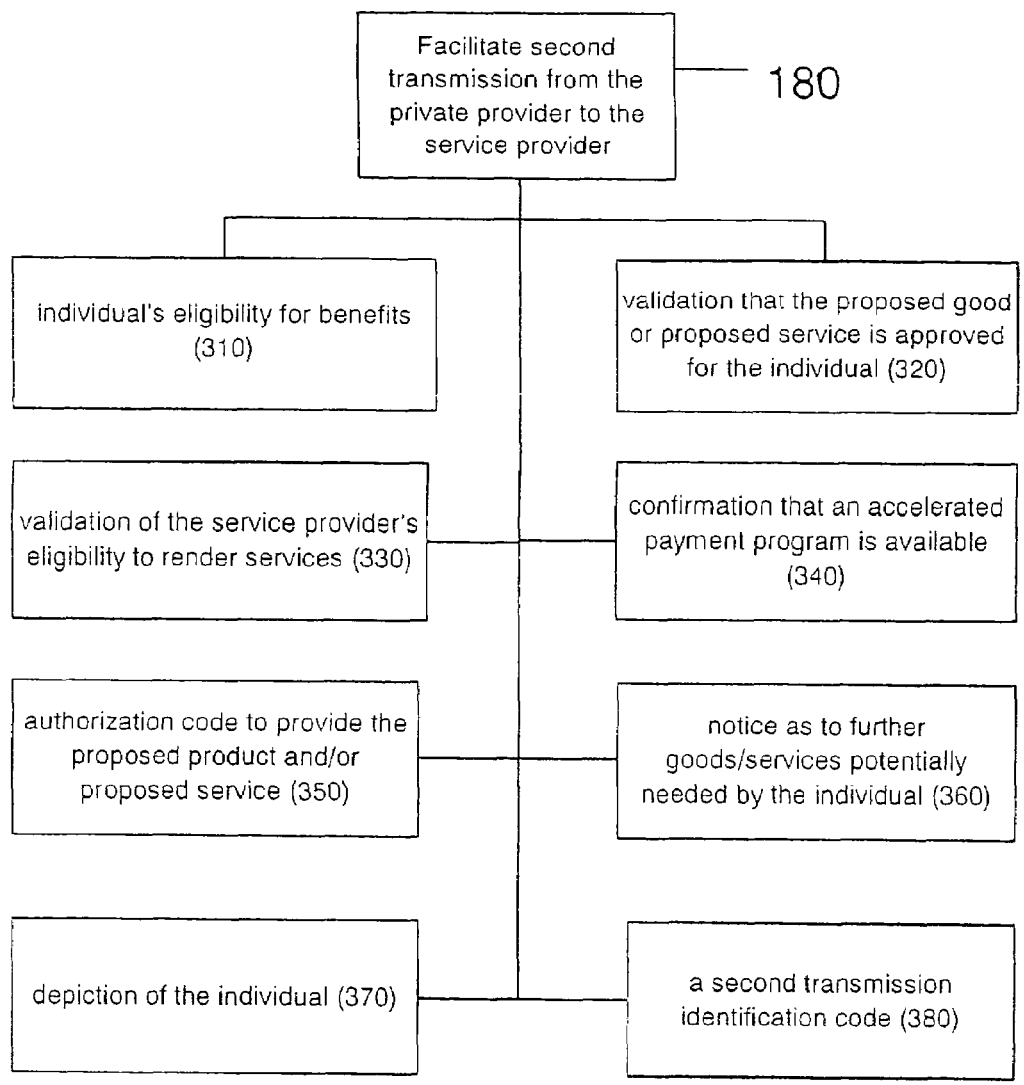
FIG. 3 depicts a diagrammatic representation of the second transmission.

As shown in FIG. 3, a second transmission (180) includes individual's eligibility for benefits under the healthcare program (310), validation that the proposed good or proposed service is approved for the individual (320), validation of the service provider's eligibility to render services under the healthcare program (330), confirmation that an accelerated payment program is available (340), and authorization code to provide the proposed product and/or proposed service (350).

The second transmission (180) can include notice as to further goods/services potentially needed by the individual (360), depiction of the individual (370), a second transmission identification code (380), and combinations thereof.

Figure 4:
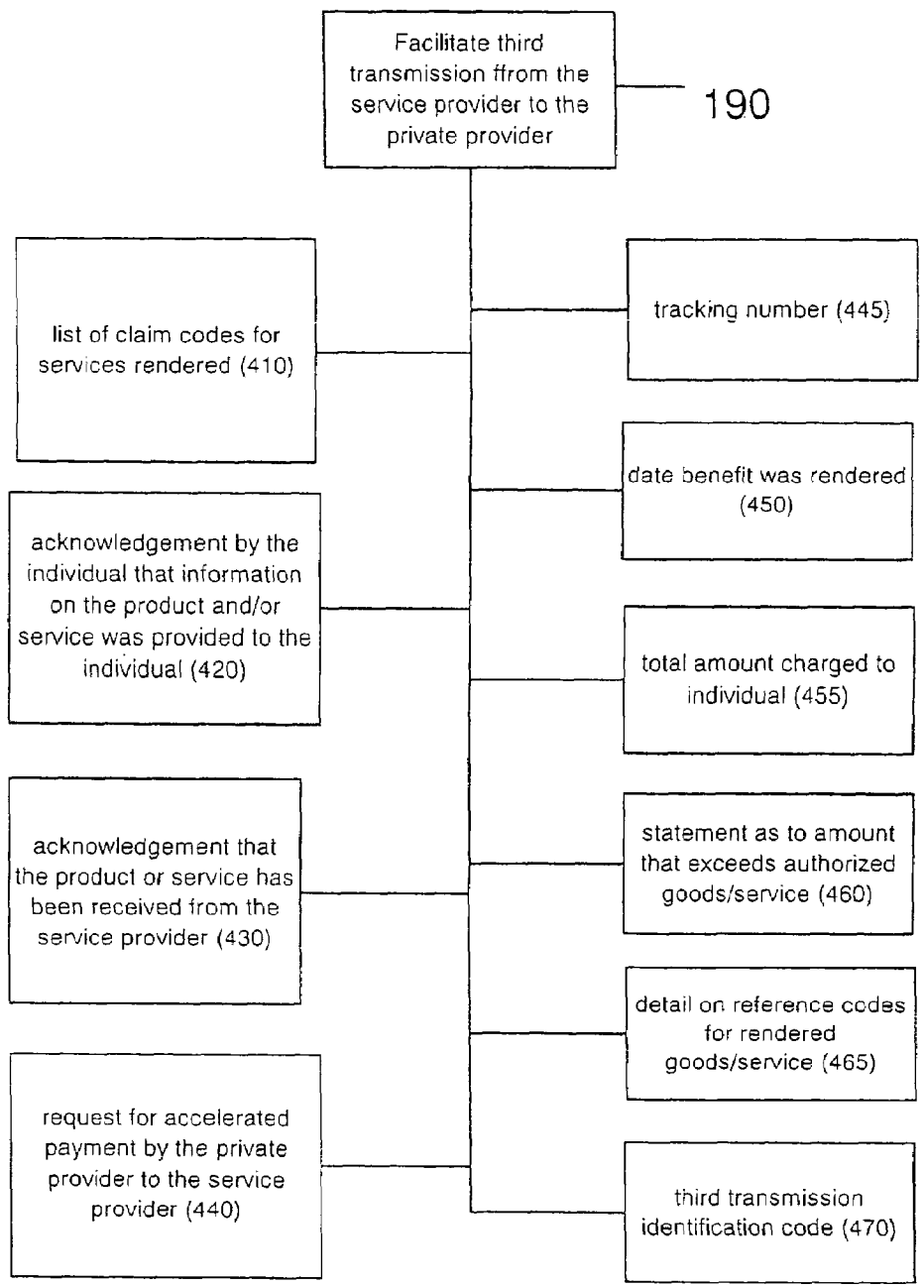
FIG. 4 depicts a diagrammatic representation of the third transmission.

The third transmission (190), shown in FIG. 4, involves list of claim codes for services rendered (410), acknowledgement by the individual that information on the product and/or service was provided to the individual (420), acknowledgement that the product or service has been received from the service provider (430), and request for accelerated payment by the healthcare provider to the service provider (440).

On approximately the same day that the third transmission is received by the healthcare provider, funds are transmitted from the healthcare provider to the service provider (180) for the product and/or service provided to the individual.

The third transmission (190) can also involve a tracking number (445); date benefit was rendered (450); total amount charged to individual (455); statement as to amount that exceeds rendered benefit (460); detail on reference codes for rendered benefit (465); a third transmission identification code (470); and combinations thereof.

The funds can be for a completed authorized benefit. A completed authorized benefit is a service that has been authorized by contract by the healthcare provider or is a stated item of coverage in a healthcare provider benefit plan.

The method can include using an electronic retrieval system. The electronic retrieval system contains a database that stores personal data for comparison purposes. The electronic retrieval system can comprise a process, such as an internet query, an e-mail query, a network query, comparative information transfers, and combinations thereof.

While these embodiments have been described with emphasis on the preferred embodiments, it should be understood that within the scope of the appended claims the embodiments might be practiced other than as specifically described herein.

What is claimed is:

1. A method for reducing fraud in a healthcare program, wherein the method consists of the steps of:
   a. registering a service provider with a healthcare provider and issuing a service provider identification code;
   b. registering at least one service or at least one good of the service provider with the healthcare provider and identifying a claim code for each registered service or registered good;
   c. issuing and storing a first individual identification code to a first individual related to the healthcare program, wherein the first individual identification code is linked to a biometric data of the first individual;
   d. comparing second biometric data from a second individual against the first individual identification code to determine if the second individual is eligible for benefits from the healthcare program;
   e. sending a first transmission from the service provider to the healthcare provider, wherein the first transmission comprises:
      i. the service provider identification code;
      ii. the individual identification code;
      iii. proposed information selected from the group consisting of proposed product information for the second individual; proposed service information for the second individual; corresponding claim codes for the proposed product; and corresponding claim codes for the proposed service; and
      iv. a request to confirm:
         1. the second individual's eligibility for benefits under the healthcare program;
         2. a validation that the proposed good or service is approved for the individual;
         3. the service provider's eligibility to render services or provide goods under the healthcare program; and
         4. a request to participate in an accelerated payment program for the proposed good or the proposed service;
   f. sending a second transmission from the healthcare provider to the service provider, wherein the second transmission comprises:
      i. the second individual's eligibility for benefits under the healthcare program;
      ii. a validation that the proposed good or proposed service is approved for the second individual;
      iii. a validation of the service provider's eligibility to render services under the healthcare program;
      iv. a confirmation that an accelerated payment program is available; and
      v. providing an authorization code to provide the proposed product or proposed service;
   g. sending a third transmission from the service provider to the healthcare provider, wherein the third transmission comprises of:
      i. a claim codes list for services rendered;
      ii. acknowledgement by the individual that information on the product or service was provided to the second individual;
      iii. acknowledgement that the product or service has been received from the service provider; and
      iv. a request for accelerated payment by the healthcare provider to the service provider.

2. The method of claim 1, wherein the second transmission further comprises an alert to the service provider that a portion of the funds may need to come from the individual and an indication of the amount of the funds.

3. The method of claim 1, wherein the third transmission further comprises dollar amount limits for the accelerated payment.

4. The method of claim 1, further comprising the step of wherein between zero and two days of receipt of the third transmission by the healthcare provider funds are transmitted from the healthcare provider to the service provider.

5. The method of claim 1, wherein the first transmission further comprises a member of the group consisting of:
   a. a first transmission identification code;
   b. service provider information that comprises a member of the group consisting of:
      i. service provider code;
      ii. service provider name;
      iii. service provider address;
      iv. service provider office code; and
      v. service provider phone number;
   c. individual information that comprises a member of the group consisting of:
      i. individual name;
      ii. individual address;
      iii. private healthcare provider phone number;
      iv. individual social security number; and
      v. combinations thereof.

6. The method of claim 1, wherein the second transmission further comprises a member of the group consisting of:
   a. a notice as to further services or goods potentially needed by the individual;
   b. a depiction of the individual; and
   c. a second transmission identification code and combinations thereof.

7. The method of claim 1, wherein the third transmission comprises of:
   a. a tracking number;
   b. a date on which the benefit was rendered;
   c. a total amount charged relative to the individual;
   d. a statement as to any amount that exceeds authorized service or good;
   e. detail on the claim codes for rendered service or good;
   f. a third transmission identification code; and
   g. combinations thereof.

8. The method of claim 1, wherein the individual's benefit history comprises information on length of time on private healthcare provider programs and types of other programs the individual is eligible to use.

9. The method of claim 1, further comprising the step of creating a contractual relationship between the healthcare provider and a third party for the benefit of the individual.

10. The method of claim 1, further comprising the step of using an electronic retrieval system, wherein the electronic retrieval system comprises a database that contains personal data for comparison purposes.

11. The method of claim 10, wherein the electronic retrieval system comprises a process selected from the group consisting of an internet query, an e-mail query, a network query, comparative information transfers, and combinations thereof.

* * * * *